May 24, 1960

C. E. BARKALOW 2,937,533

BUOYED GYROSCOPE

Filed April 4, 1957

INVENTOR
CLARE E. BARKALOW
BY Henry Shenier
ATTORNEY

May 24, 1960

C. E. BARKALOW 2,937,533

BUOYED GYROSCOPE

Filed April 4, 1957

INVENTOR
CLARE E. BARKALOW
BY Henry L. Hunier
ATTORNEY

May 24, 1960

C. E. BARKALOW 2,937,533

BUOYED GYROSCOPE

Filed April 4, 1957

INVENTOR
CLARE E. BARKALOW
BY Henry L. Shevier
ATTORNEY

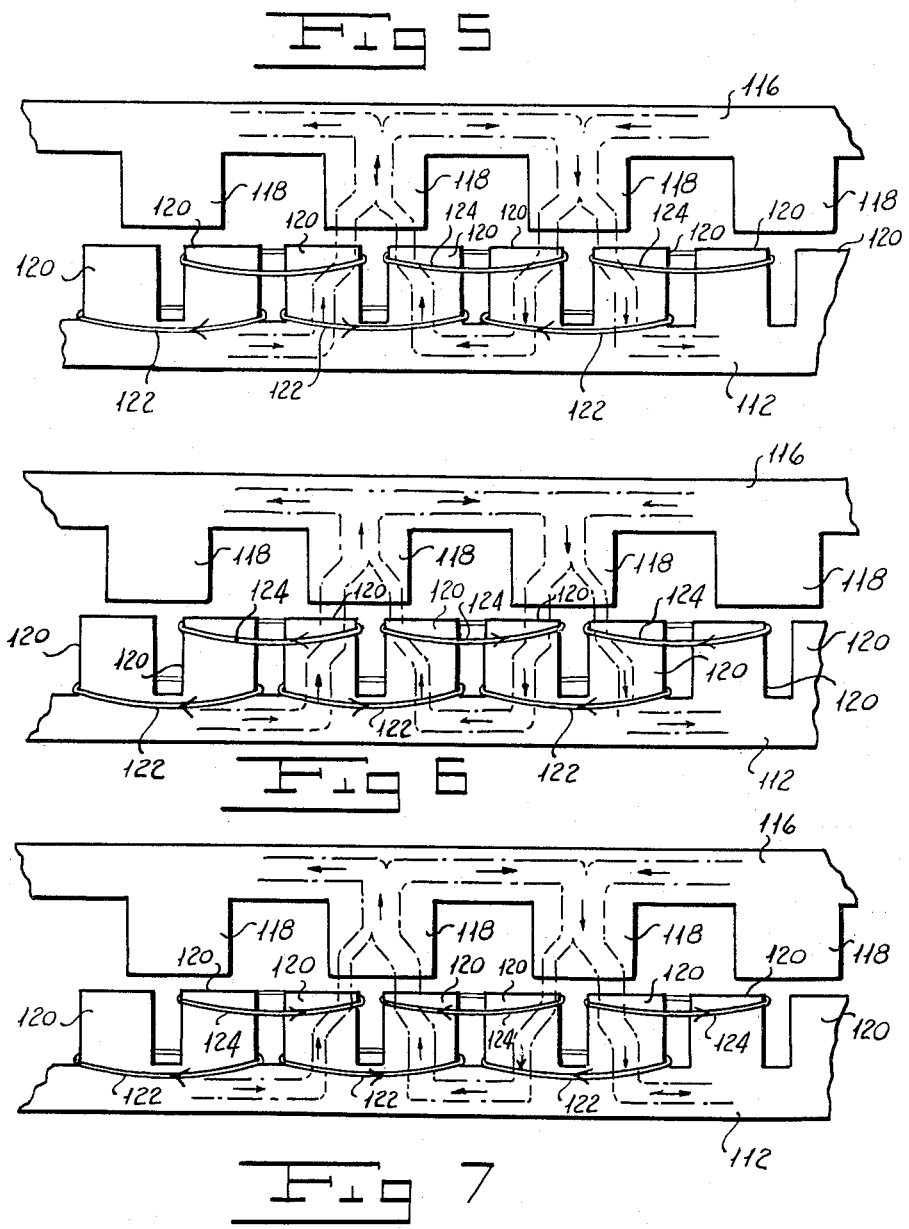

United States Patent Office 2,937,533
Patented May 24, 1960

2,937,533

BUOYED GYROSCOPE

Clare E. Barkalow, Huntington, N.Y., assignor, by mesne assignments, to United Aircraft Corporation, East Hartford, Conn., a corporation of Delaware Filed Apr. 4, 1957, Ser. No. 650,588

4 Claims. (Cl. 74—5.5)

My invention relates to a buoyed gyroscope and more particularly to an improved buoyed rate gyroscope which produces a high level, accurate output signal.

Rate gyroscopes are known in the prior art for use in control servomechanism, stabilization systems and the like. A number of factors contribute to the accuracy of the output signal of these gyroscopes. For an accurate output signal to be produced, the gimbal bearing friction should be held to a minimum value. Further, it is desirable that the gimbal assembly be provided with damping means to achieve an improved frequency response and to prevent oscillations. Where the gyroscopes are employed in missile guiding systems, they are subjected to large forces of acceleration and deceleratiaon and, therefore, must be protected against shock.

It has been suggested in the prior art that the gyroscope motor be supported in a sealed gimbal housing, which is floated in a fluid contained in an outer casing, while the housing is constrained to move about an axis disposed at right angles to the gyroscope spin axis. This manner of supporting the gyroscope gimbal assembly reduces the gimbal bearing friction and provides a damping force for the gimbal assembly. Further, it assists in preventing damage to the gyroscope from shocks incident to its use in a missile guiding system and the like.

Floatation of a gyroscope gimbal assembly, while solving some of the problems of the prior art, introduces additional problems. Gyroscopes employed in systems such as missile guiding assemblies are subject to extreme changes in temperature. These temperature changes affect the viscosity of the floatation fluid to interfere with its damping action. For this reason it is desirable to maintain the fluid at a relatively constant temperature to hold its viscosity to a predetermined value. This object could be accomplished by using a device such as a thermostat which is directly responsive to temperature, if the average temperature of the fluid could be applied to the thermostat at all times. In practice I have found that no given location within the gyroscope assembly casing is always at the average temperature of the fluid. For this reason the use of a device such as a thermostat directly responsive to temperature has not proved to be a satisfactory solution to the problem of maintaing a constant viscosity of the fluid, and thus a constant damping force.

It is further desirable in a rate gyroscope assembly that the pick-off device employed should not contribute to any error which might exist in the output signal. It is further desirable in a rate gyroscope system that the pick-off device should not introduce any error owing to misalignment of the relatively moving parts of the device. Further the pick-off device should produce a small output signal at the null and a high level output signal in response to a displacement from the null.

I have invented an improved rate gyroscope including a floated gimbal assembly provided with means for maintaining the viscosity of the fluid substantially constant to give a uniform damping force over the range of temperatures to which the gyroscope assembly is subjected. My improved rate gyroscope employs a volumetric thermostat which operates on average fluid temperature to assure relatively constant fluid viscosity. My improved gyroscope includes a pick-off device which automatically compensates for errors which otherwise would be introduced by misalignment other than angular displacement of the relatively moving pick-off parts. My pick-off device has a small output signal at the null position and a relatively high level output signal for displacement from the null position. The floatation of my gyroscope reduces the gimbal assembly pivot friction to a small amount so that the gimbal pivots substantially define only the axis of rotation of the gyroscope housing.

One object of my invention is to produce a rate gyroscope having a floated gyroscope housing and having means for maintaining the viscosity of the fluid substantially constant.

Another object of my invention is to provide a floated rate gyroscope including a volumetric thermostat responsive to average temperature of the fluid to maintain a substantially uniform damping force over the range of temperatures to which the gyroscope assembly is subjected.

A further object of my invention is to provide a rate gyroscope having a pick-off which is responsive substantially solely to angular displacement between the relatively moving pick-off parts.

Other and further objects of my invention will appear from the following description:

In general my invention contemplates the provision of a floated rate gyroscope including a gyroscope motor supported within a sealed housing which is floated in fluid contained in an outer casing while being constrained to move about an axis of the gyroscope motor. A heating element is energized through a normally closed switch to heat the fluid in which the housing floats. As the fluid expands proportionally to the increase in its average temperature, a volumetric thermostat opens the normally closed switch to interrupt the circuit of the heating element. In this manner the viscosity of the fluid is maintained substantially constant.

My improved floated rate gyroscope includes a pick-off device having a stator including input and output windings carried by the stator poles. The stator has a number of poles equal to twice the number of rotor poles to give the effect of a plurality of E transformers arranged in an endless circle. This pick-off device has a low level null output signal and a relatively high level output signal in response to an angular displacement. The arrangement of the parts of the pick-off device is such that errors which otherwise would be introduced owing to radial misalignment of the rotor and stator parts are substantially cancelled.

In the accompanying drawings which form part of the instant specification and which are to be read in conjunction therewith and in which like reference numerals indicate like parts in the various views:

Figure 5 is a schematic fragmentary development of the pick-off device of my floated rate gyroscope showing the condition of the device at its null point.

Figure 6 is a schematic fragmentary development of the pick-off device of my floated rate gyroscope showing the condition of the device in one direction of displacement from the null point.

Figure 7 is a schematic fragmentary development of the pick-off device of my floated rate gyroscope showing the condition of the device in another direction of its displacement from the null point.

Figure 1:
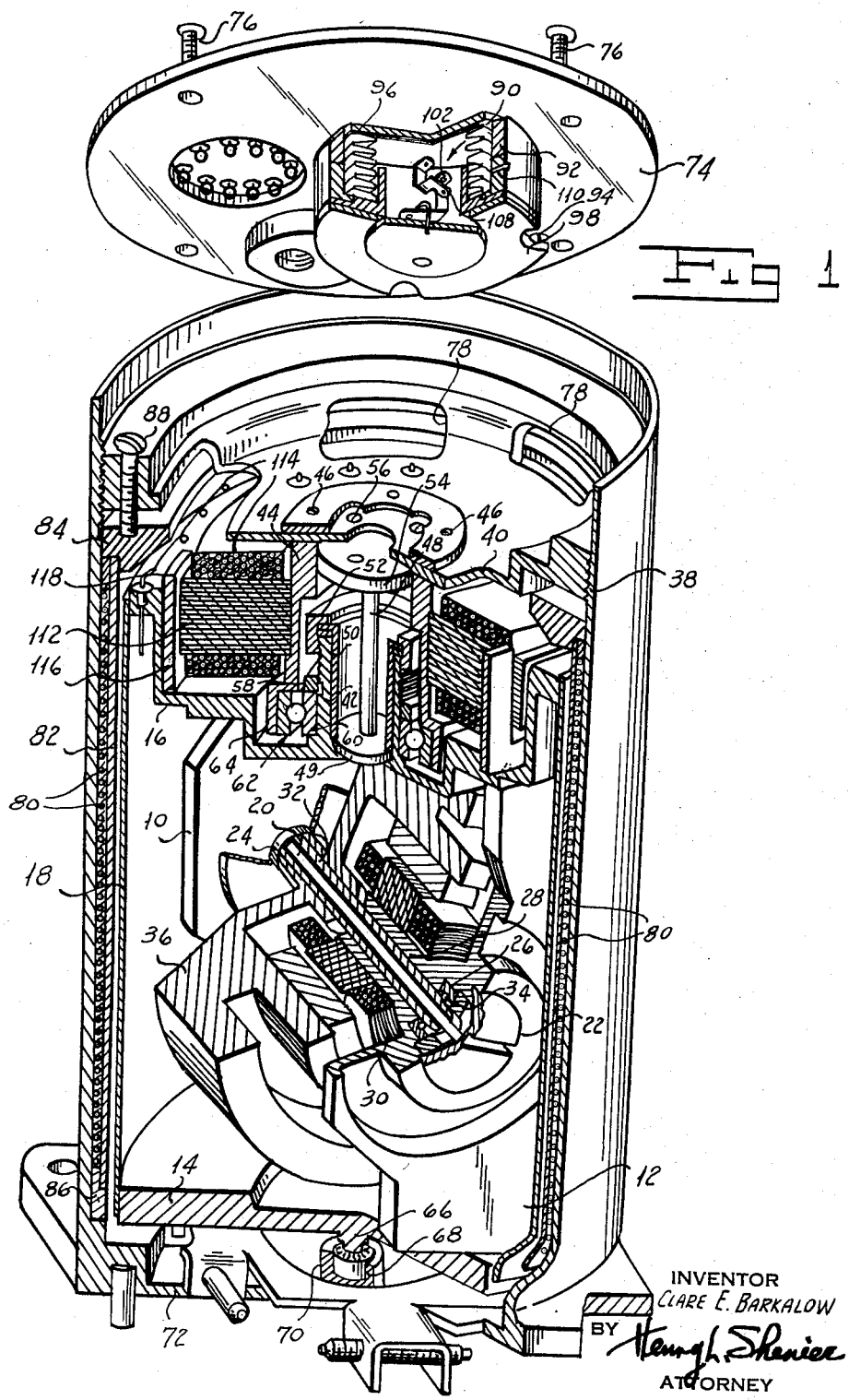
Figure 1 is an exploded perspective view of my improved rate gyroscope with parts in section.
Figure 2:
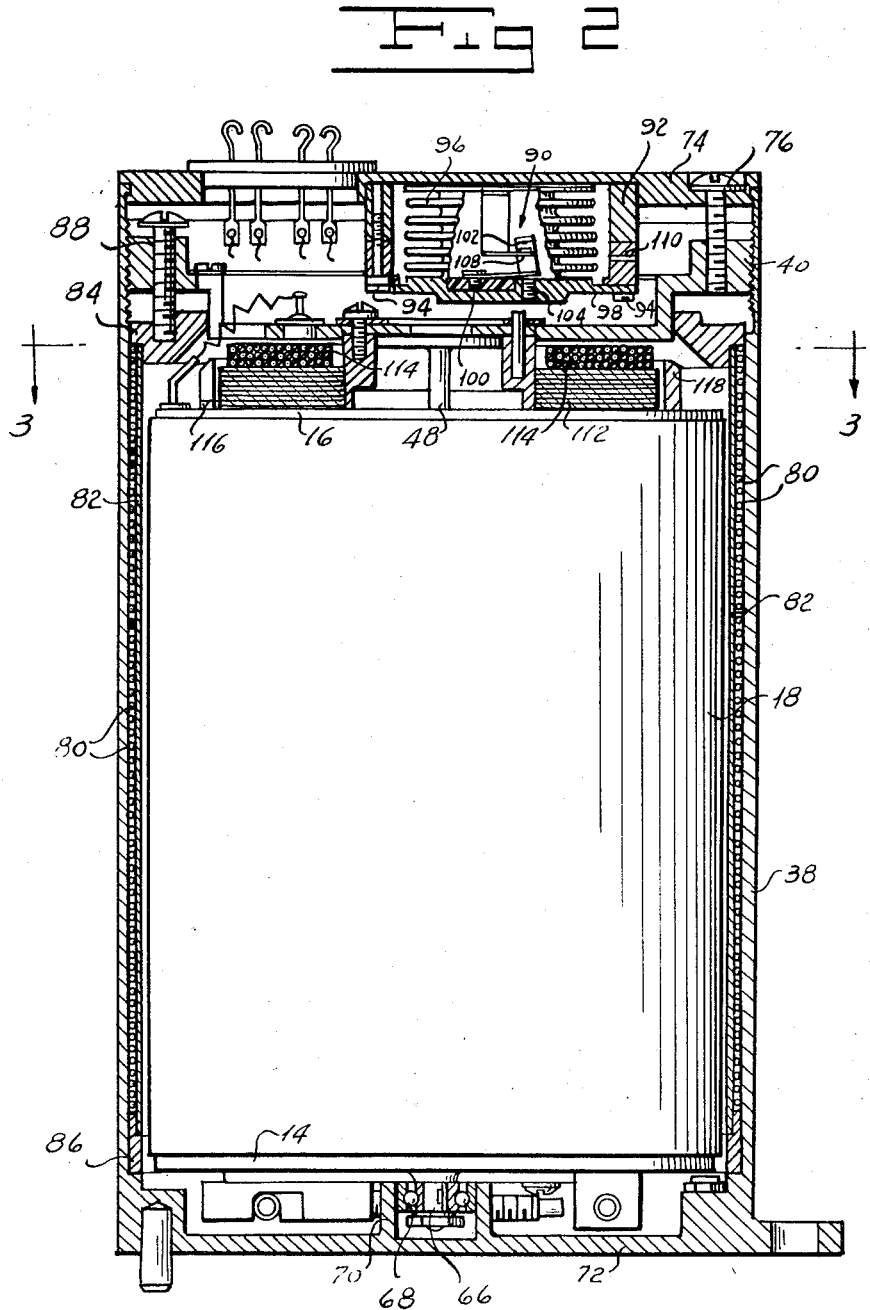
Figure 2 is a vertical sectional view of my improved rate gyroscope.
Figure 3:
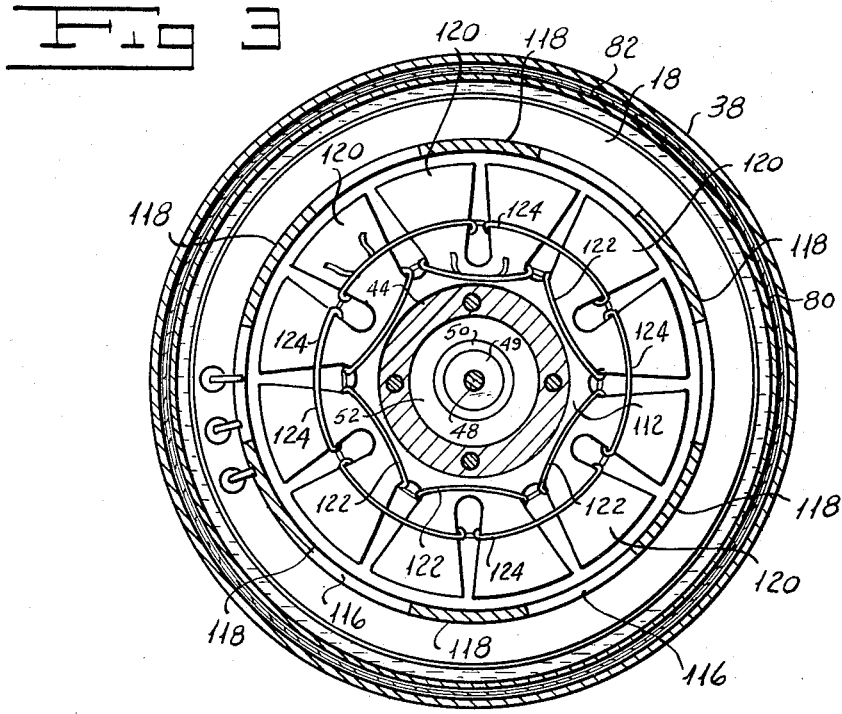
Figure 3 is a horizontal sectional view of my improved rate gyroscope taken along the line 3—3 of Figure 2.

Referring now to Figures 1 to 3 of the drawings, my improved rate gyroscope includes respective supports 10 and 12 disposed between the base 14 and cover plate 16 of the gyroscope housing 18. A bolt 20 having a head 22 retains respective outer bearing races 24 and 26 in the supports 10 and 12. I form support 12 with an inwardly extending boss 28 which carries the stator windings 30 of the gyroscope motor. A hollow shaft 32 coaxial with the shank of bolt 20 has tapered ends extending into the races 24 and 26. Balls 34 disposed between the ends of shaft 32 and the outer races 24 and 26 support shaft 32 for rotary movement. I secure a preloaded gyroscope rotor 36 to shaft 32 for rotation with the shaft. When the stator windings 30 are energized in a manner known to the art, rotor 36 rotates about a spin axis defined by the longitudinal axis of bolt 20. I may fill the housing 18 with a mixture of helium and nitrogen in a proportion of about 90 percent helium to about 10 percent nitrogen up to a pressure of approximately 25 centimeters of mercury.

My floated rate gyroscope includes an outer casing 38 in which I screw a partition 40. This partition 40 serves to support the torsion bar, the windings of the sensing device, which is to be described hereinafter, and the outer race of a bearing of the vertical bearing system. I provide the upper surface of cover plate 16 of housing 18 with a tubular boss 42 adapted to telescope within a sleeve 44 secured to the under side of partition 40 by any convenient means such as screws 46. A torsion bar 48 has a lower head 49 retained within boss 42 by a sleeve 50 held in the boss 42 by a cap 52 screwed onto boss 42. In this manner the lower head 49 is clamped to and constrained to turn with cover plate 16 and hence the floated housing 18. Bar 48 has an upper head 54 disposed in boss 44 and secured to partition 40 by means of screws 56 or the like. I form torsion bar 48 of a material such as beryllium copper contributing negligible hysteresis loss. The torsion bar 48 forms a spring against which the precessional force of the gyroscope during a turn acts. The displacement of the gyroscope against the torsion spring 48 thus enables me to measure rate. The torsion bar, of course, when the rate becomes zero restores the gyroscope to its original position with its spin axis lying in a plane at right angles to the axis of the torsion bar. A ring 58 retains the inner race 60 of a bearing indicated generally by the reference character 62 on the boss 42. I secure the outer race 64 of bearing 62 to sleeve 44 by any convenient means.

I form the base 14 of housing 18 with a stub shaft 66 disposed within the inner race of a bearing 68 disposed in a cylindrical boss 70 formed in the base 72 of casing 38. It will be seen that bearings 62 and 68 support housing 18 for movement about an axis at right angles to the spin axis of rotor 36.

I fill the outer casing 32 wiht a fluid such, for example, as a silicone or a "Fluorolube," which latter is the registered trademark of the Hooker Electrochemical Company for a trifluorovinyl chloride to float the housing 18 within the casing 38. It will be understood, of course, that the housing 18 which is completed by upper plate 16 and lower plate 14 is sealed so that the gas therein under reduced pressure will not be contaminated by leakage either from the atmosphere or by vapors from the floatation liquid.

As has been explained hereinabove, this floating of housing 18 reduces the bearing friction of bearings 62 and 68 so that substantially the sole function of these bearings is to define the axis of rotation of housing 18. Further, this floatation of housing 18 provides a damping force which improves the frequency response of my floated gyroscope.

As has also been explained hereinabove, a floated gyroscope used in a missile guidance system or the like is subject to extreme changes in temperature which affect the viscosity of the fluid in which the gyroscope housing floats. I secure a cover plate 74 to the top of the outer case 38 by any convenient means such as screws 76. Fluid in the casing 38 flows through openings 78 in the partition 40 to fill the space between cover plate 74 and partition 40 as well as the space below partition 40. When the gyroscope assembly is used on a missile or the like it is subjected to a wide range of temperatures. I dispose a bifilar noninductive winding 80 of resistance wire between the wall of casing 38 and a jacket 82 secured within the casing between a retaining ring 84 and a spacing ring 86. Any convenient means such as screws 88 hold the jacket in position within the casing through ring 84. As will be explained hereinafter the circuit of winding 80 is completed through a normally closed switch indicated generally by the reference character 90.

I secure a housing 92 to the underside of cover plate 74 by any convenient means such, for example, as screws 94. These screws 94 also secure the base 98 of a bellows 96 to the housing 92. Any convenient means such as a screw 100 fixes one contact 102 of switch 90 in position on base 98. A set screw of nylon, or any other dielectric material, 104 permits adjustment of the position of this contact within the bellows. I mount the support 106 of the other contact 108 of switch 90 on the top of bellows 96 by means such as solder or the like. A bore 110 formed in the wall of housing 92 has a diameter of approximately 0.002 inch to admit fluid into the housing 92 while preventing surging of the fluid in the housing from affecting the bellows. It is to be understood that the housing must be completely filled with liquid. There should be no bubbles.

When the temperature of the fluid within the casing 38 rises under the action of the heating winding 80 its volume increases an amount proportional to the average temperature of the fluid. Upon expansion of the fluid within the casing 38 liquid flows into housing 92 through bore 110 to act on bellows 96 to compress the bellows to open switch 90 to interrupt the circuit of winding 80. As the liquid cools it contracts and bellows 96 expands again to close switch 90 to re-establish the circuit of heating coil 80.

I mount a stack 112 of laminations carrying a winding 114 including input and output windings on the boss 44 to form the stator of my pick-off device. A magnetic member 116 formed with a plurality of teeth 118 is secured to plate 16 to form the rotor of my pick-off device.

As can be seen by reference to Figures 3 and 5 to 7 the stator 112 of my pick-off device includes a number of teeth 120 which may, for example, be twelve. If I provide twelve stator teeth 120, I provide six rotor teeth 118. While I have shown this number of teeth in the drawings, it is to be understood that a greater or less number of teeth may be provided as desired.

The input winding of my pick-off device includes a plurality of series-connected coils 122 spanning adjacent pairs of teeth 120. As will be explained hereinafter, I energize the coils 122 from a source of alternating current potential to produce a flux which links the rotor teeth 118. The output winding of my pick-off includes a plurality of series-connected coils 124 each of which spans a pair of adjacent teeth 120, each of which pairs of teeth includes a tooth spanned by a respective input winding coil 122.

In Figures 3 and 5 to 7 for purposes of simplicity I have shown the input winding coils 122 and the output winding coils 124 as single loops of wire. I so connect the coils 122 that a current passing through the coils travels in opposite directions through adjacent coils. This current flowing in the input winding produces a flux which is indicated by the area enclosed in dot-dash lines in Figures 5 to 7.

I form rotor 116 with a number of teeth 118 equal to half the number of stator teeth 120. Each of the teeth 118 is sufficiently wide to bridge a stator tooth completely. In the relative position of stator 112 and rotor 116 shown in Figure 5 it will be seen that the amount of flux flowing upwardly through an output coil 124 as viewed in the figure is equal to the amount of flux flowing downwardly through the coil. Since these fluxes are equal and opposite no voltages are induced in a coil 124 with the result that the output signal in this relative position of the rotor and stator is zero.

Referring now to Figure 6, I have shown rotor 116 as being slightly displaced to the left as viewed in the figure from the position of the rotor shown in Figure 5. In this relative position of the stator and rotor it can be seen that the amount of flux flowing in one direction through a coil 124 is greater than the amount of flux flowing in the opposite direction through the same coil with the result that voltages tending to produce currents having the directions indicated by the arrowheads in Figure 6 are induced in the output windings 124. As a result of this current flow an output signal of a predetermined phase is produced in the output winding including coils 124.

Referring now to Figure 7, I have shown rotor 116 in a position displaced slightly to the right from the position of the rotor shown in Figure 5. In this relative position of the stator and rotor more flux flows in one direction through each one of the output coils 124 as viewed in the figure than flows in the opposite direction through respective coils. The direction of the majority of the flux in the coil in the case of Figure 7 is opposite to the direction of flux in that coil in Figure 6. As a result the output winding coils have induced voltages tending to produce currents which flow in the directions shown in Figure 7. The output winding including coils 124 now has an induced signal which is of opposite phase with respect to the signal which was produced in the relative position of the rotor and stator shown in Figure 6.

From the foregoing it will be seen that my pick-off device is phase sensitive and produces an output signal having a phase representative of the direction of displacement of the rotor from the null position shown in Figure 5. The magnitude of the output voltage is proportional to the magnitude of the displacement from the null position. It is to be noted that in all relative positions of the stator 112 and the rotor 116 the gap flux is substantially constant. As a result my pick-off provides a highly linear output signal even at high levels of excitation voltage. Moreover, it requires only a very small gap which may be, for example, 0.005 inch.

It is very sensitive and has a low output circuit internal impedance. The phase shift between the input voltage and the output voltage is very small.

Figure 4:
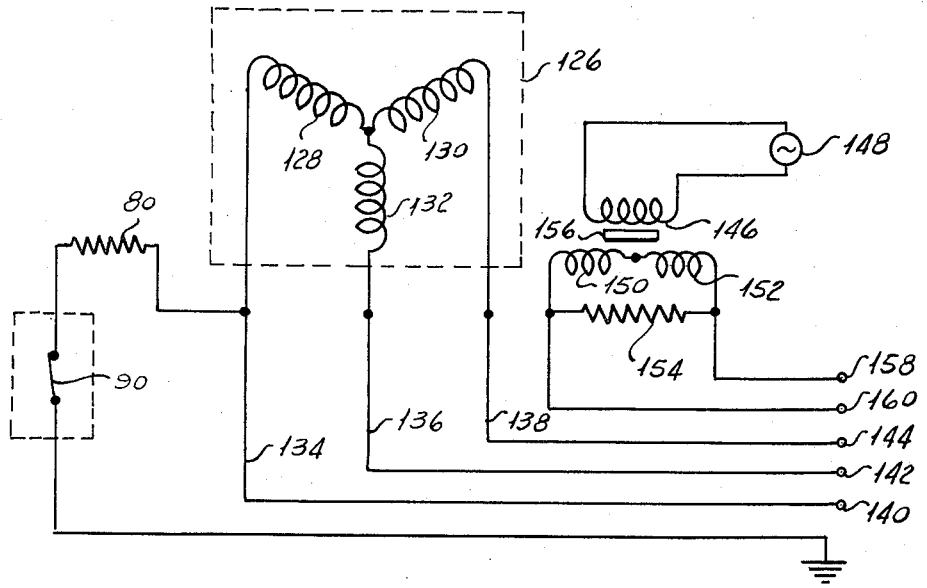
Figure 4 is a schematic view showing the wiring diagram of the electrical system of my improved rate gyroscope.

Referring now to Figure 4, the gyroscope motor indicated schematically in the figure by the reference character 126 is a three-phase hysteresis motor having three Y-connected windings 128, 130 and 132, the input terminals of which are conected by respective conductors 134, 136 and 138 to the terminals 140, 142 and 144 of a suitable source of three-phase potential. I connect the heating coil 80 and normally closed bellows operated switch 90 in series between one phase of the supply and ground to provide an energizing potential for the heater. As has been explained hereinabove, coils 122 make up the input winding indicated schematically in Figure 4 of the drawings by the reference character 146 of my pick-off device. I connect a suitable source 148 of excitation potential across winding 146. The coils 124 make up the output winding of my pick-off device which I have indicated schematically in Figure 4 as a pair of series-connected, oppositely wound coils 150 and 152 having a damping resistor 154 connected across the windings. When the rotor, indicated schematically in Figure 4 by the reference character 156, is displaced in one direction or the other from the null position in which it provides equal flux linkages between winding 146 and coil 150 and between winding 146 and coil 152, an output signal of one phase or the other is produced at the output terminals 158 and 160 of the pick-off device.

In operation of my floated rate gyroscope switch 90 is normally closed to complete the circuit of resistance winding 80 to heat the fluid within casing 38. As the fluid expands it compresses bellows 96 to open switch 90 to interrupt the circuit of winding 80 to permit the fluid to cool. As the fluid cools it contracts and bellows 96 expands to close switch 90 again to complete the circuit of winding 80. In this manner I maintain the viscosity of the fluid floating housing 18 substantially constant with the result that the damping force on housing 18 is substantially uniform over the range of temperatures to which the assembly is subjected. The fluid floating housing 18 also reduces the friction in bearings 62 and 68 to a point at which substantially the only function performed by these bearings is the definition of the axis of rotation of housing 18. The fluid which floats the housing 18 also assists the assembly to withstand shocks incident to acceleration and deceleration. When the casing 38 and housing 18 rotate relative to each other rotor 116 is displaced angularly from the null position to cause the output winding including coils 124 to produce an output signal having a phase representative of the direction of displacement and a magnitude representing the amount of the displacement. Owing to the arrangement of my pick-off any errors which otherwise would be introduced into the output signal by lack of radial symmetry of the pick-off cancel each other. That is, if the stator 112 were eccentric with respect to the rotor then the coupling between the input and output windings would be greater on one side of the pick-off and the less on the other to give a relatively constant average coupling for all relative angular positions of the stator and rotor. The signal, of course, in the arrangement shown represents the rate at which the assembly is being rotated around a horizontal axis extending at right angles to the spin axis of the gyroscope rotor.

It will be seen that I have accomplished the objects of my invention. I have provided a floated rate gyroscope which gives an accurate, high level output signal. My gyroscope has a floated housing to reduce the pivot friction and to afford damping of the gyroscope housing. My gyroscope includes a volumetric thermostat which acts in response to changes in average temperature of the fluid floating the housing to maintain the liquid viscosity substantially constant. My gyroscope includes a pick-off device having a low level null output signal and a relatively high level output signal in response to a displacement from the null. My pick-off device introduces no errors as a result of radial misalignment of the moving parts of the pick-off device. My pick-off device produces a highly linear output signal and requires only a low coercive torque.

It will be understood that certain features and subcombinations are of utility and may be employed without reference to other features and subcombinations. This is contemplated by and is within the scope of my claims. It is further obvious that various changes may be made in details within the scope of the claims without departing from the spirit of my invention. It is therefore to be understood that my invention is not to be limited to the specific details shown and described.

Having thus described my invention, what I claim is:

1. A buoyed gyroscope assembly including in combination a gyroscope housing, a casing, a fluid disposed in said casing for buoyantly supporting said housing, means defining an axis of rotation for said housing, means for heating said fluid, an expansible bellows, means mounting said bellows within said casing to be acted upon by said fluid, a normally closed switch having a pair of contacts, means mounting a first one of said contacts within said bellows for movement therewith, and means mounting the other of said contacts on said casing, the arrangement being such that the operation of said switch controls said fluid heating means.

2. A buoyed gyroscope assembly including in combination a gyroscope housing, a casing, a fluid disposed in said casing for buoyantly supporting said housing, means defining an axis of rotation for said housing, means for heating said fluid, an enclosure, means mounting said enclosure within said casing, an expansible bellows disposed within said enclosure, a normally closed switch having a pair of contacts, means mounting one of said contacts within said bellows for movement therewith, means mounting the other of said contacts on said enclosure and means for admitting fluid from said casing into said enclosure.

3. A buoyed gyroscope as in claim 2 in which said fluid-admitting means comprises means forming a restricted opening in said enclosure to pass fluid without turbulence into said enclosure.

4. A bouyed rate gyroscope assembly including in combination a casing, a housing, a gyroscope rotor, means for mounting said gyroscope rotor in said housing for rotation therein about an axis extending at right angles to the axis of said housing, means for mounting said housing in said casing for rotation about an axis extending coaxially with the axis of said casing, means for sealing said housing, a liquid in said casing adapted to buoy said housing, a torsion bar positioned coaxially with the common axis of said casing and said housing, means for securing one end of said torsion bar to said housing, means for securing the other end of said torsion bar to said casing, a liquid heater disposed adjacent said liquid, an enclosure, means mounting said enclosure within said casing, a thermostat disposed in said enclosure for controlling said heater, said thermostat comprising an expansible bellows disposed in said enclosure and a normally closed switch including a pair of contacts, means mounting one of said contacts within said bellows, means mounting the other of said contacts on said enclosure, means providing communication between the enclosure and the casing whereby liquid in said casing may act upon said bellows to operate said switch to control said heater to maintain the temperature of said liquid in the vicinity of a predetermined point whereby to maintain the viscosity of the liquid substantially constant and means carried by said casing and said housing for sensing the relative displacement of said housing with respect to said casing around said common axis.

References Cited in the file of this patent

UNITED STATES PATENTS

| | | |
|---|---|---|
| 1,265,765 | Ferris | May 14, 1918 |
| 1,809,642 | Speery | June 9, 1931 |
| 2,260,396 | Otto | Oct. 28, 1941 |
| 2,585,024 | Fundberg | Feb. 12, 1952 |
| 2,669,126 | Simmons et al. | Feb. 16, 1954 |
| 2,714,311 | Dobson | Aug. 2, 1955 |
| 2,766,627 | Lower et al. | Oct. 16, 1956 |
| 2,797,581 | Carter | July 2, 1957 |
| 2,847,664 | Lewis | Aug. 12, 1958 |